United States Patent [19]

Harper et al.

[11] Patent Number: 5,519,826
[45] Date of Patent: May 21, 1996

[54] STOP MOTION ANIMATION SYSTEM

[75] Inventors: Dennis D. Harper, Campbell; J. Cameron Petty, Mountain View; Stephen R. Riesenberger, San Jose, all of Calif.

[73] Assignee: Atari Games Corporation, Milpitas, Calif.

[21] Appl. No.: 236,634

[22] Filed: Apr. 29, 1994

[51] Int. Cl.$^6$ .................................................. G06F 15/00
[52] U.S. Cl. ........................................ 395/152; 395/135
[58] Field of Search .............................. 395/152, 135; 345/122; 348/586, 587, 592; 358/311, 332; 352/45–54, 87, 89

[56] References Cited

U.S. PATENT DOCUMENTS

| | | | |
|---|---|---|---|
| 2,740,712 | 4/1956 | Pohl | 352/48 |
| 3,510,210 | 5/1970 | Haney | 352/39 |
| 3,747,087 | 7/1973 | Harrison et al. | 345/22 |
| 3,778,542 | 12/1973 | Hanseman | 348/587 |
| 3,970,379 | 9/1976 | Fedder | 352/52 |
| 4,100,569 | 7/1978 | Vlahos | 348/587 |
| 4,109,278 | 8/1978 | Mendrala et al. | 348/587 |
| 4,357,624 | 11/1982 | Greenberg | 348/587 |
| 4,406,529 | 9/1983 | Anthony | 352/89 |
| 4,417,791 | 11/1983 | Erland et al. | 352/89 |
| 4,537,481 | 8/1985 | Witty | 352/89 |
| 4,619,507 | 10/1986 | Anthony | 352/46 |
| 4,677,576 | 6/1987 | Berlin, Jr. et al. | 395/130 |
| 4,698,666 | 10/1987 | Lake, Jr. et al. | 348/584 |
| 4,968,132 | 11/1990 | Ferren | 352/46 |
| 5,025,400 | 6/1991 | Cook et al. | 395/125 |
| 5,029,997 | 7/1991 | Faroudja | 352/87 |
| 5,061,061 | 10/1991 | Robley et al. | 352/89 |
| 5,068,646 | 11/1991 | Baker | 345/122 |
| 5,179,641 | 1/1993 | Comins et al. | 395/132 |
| 5,260,780 | 11/1993 | Staudt, III | 348/139 |
| 5,398,309 | 3/1995 | Atkins et al. | 395/135 |
| 5,400,081 | 3/1995 | Chaplin | 348/587 |
| 5,438,651 | 8/1995 | Suzuki et al. | 395/135 |
| 5,455,633 | 10/1995 | Gehrmann | 348/587 |
| 5,459,529 | 10/1995 | Searby et al. | 348/586 |

FOREIGN PATENT DOCUMENTS 2157122A  10/1985  United Kingdom .

OTHER PUBLICATIONS

Porter et al., "Compositing Digital Images", *Computer Graphics*, v. 18, n. 3, Jul. 1984, pp. 253–259.

*Primary Examiner*—Heather R. Herndon
*Assistant Examiner*—Joseph R. Burwell
*Attorney, Agent, or Firm*—Knobbe, Martens, Olson & Bear

[57] ABSTRACT

A system for developing stop motion animation sequences including a lighting system, an image capture system and a video processing system. An object is positioned on a stage in a desired pose and is illuminated. A camera records the illuminated object and the image capture system digitally records this image as a beauty shot. The object is then illuminated by an back light which produces a silhouette. The camera then records this silhouette and the image capture system digitally records this image as a matte shot. The object is then illuminated by an overhead light which produces a shadow on the stage. The camera records this image and the image capture system records this image as a shadow shot. The beauty, matte and shadow shots are then processed by the graphics processing system. Subsequently, the beauty and matte shots are combined to produce a final beauty shot whereby only the portion of the image in the beauty shot that has the same position as the silhouette in the matte shot is included in the final shadow shot. Hence, a perfectly matted final beauty shot is produced along with a corresponding shadow shot. This process is repeated for each shot comprised of multiple frames of the stop motion animation sequence.

45 Claims, 7 Drawing Sheets

STOP MOTION ANIMATION SYSTEM

Background of the Invention

1. Field of the Invention

The present invention relates to a system and method for developing stop motion animation sequences and, in particular, concerns a system which captures digital images of an object, its silhouette, and its shadow for each frame of the stop motion animation sequence and processes these images to produce a final image and shadow for the object for each frame of the sequence.

2. Description of the Related Art

Stop motion animation is a well known technique for developing animated movies and videos. This technique essentially consists of taking individual pictures of an object, e.g., a figurine, in a series of different poses and then assembling and rapidly displaying the individual pictures so that the figurine appears to move.

Typically, stop motion animation sequences are developed using a well known travelling matte (TM) technique. In this technique, the object is front lit and a still picture is taken of the object in one desired pose against a blue color key background. This still picture is sometimes known as a beauty shot. The object in the same desired pose is then back lit to produce a silhouette of the object, and a picture is then taken of the silhouette to produce a "silhouette matte." The silhouette matte is then placed over the beauty shot and the blue color key background is removed from around the object in the desired pose to produce a final beauty shot of the object. The final beauty shot of the object can then be inserted into a different picture where it is shown against a different background. As is understood in the art, the final beauty shots are then replicated to form a series of identical frames which are then displayed as part of the animation sequence. This process is generally repeated for each shot of the stop motion animation sequence where the object is posed in different positions. Thus, when the final sequence of pictures is assembled, the object appears to move across the new background in a continuous, fluid and life-like fashion.

Heretofore, this processing has been done either with film or with analog video techniques. The film technique generally requires extensive film processing as individual beauty shots and silhouettes of the object in each of the desired poses have to be taken, then combined and spliced to form the each of the final beauty shots used in the sequence. Further, the final beauty shots must then be spliced into pictures of the background which have matching female mattes formed in the desired position in the background.

The above-described labor intensive process for producing stop motion animation sequences have generally prevented their extensive use in such applications as video games where the costs of preparing detailed stop motion animation sequences have typically been prohibitive. Even where video processing techniques, which produce pictures using a plurality of pixels on a screen, are used, an extensive amount of time is required to produce each final beauty shot of the object.

One specific problem which adds to the time and expense of producing stop motion animation sequences for video applications is that the silhouette matte does not always have specifically the same dimensions as the original beauty shot of the object. Consequently, when the final beauty shot is produced, a halo often appears around the object in that final beauty shot. This halo is the portion of the background that was covered by the matte when the matte and the beauty shot were combined.

This problem is exacerbated in applications such as video games where the final beauty frame is generally scaled or shrunk to fit within the desired background. When the final beauty picture is scaled in this fashion, the halo often becomes more pronounced and noticeable. To alleviate this problem, once the final beauty shot is prepared, an animator generally has to touch up each beauty shot by changing the color of each of the pixels or otherwise removing the pixels forming the halo. A single stop motion animation sequence can have hundreds or even thousands of different poses for the object. Consequently, the artist has to individually change a large number of pixels to touch up each of the final beauty shots for each of these poses. This can be a very time consuming, tedious and expensive process.

Problems are also experienced in the use of video technology to produce stop motion animation images. The most difficult of these problems results from the aliasing effects present in video systems. Aliasing is defined in video applications as the jagged or stepped appearance that may be seen along the outer contours of a video image. This jagged appearance is the result of some pixels in the video screen being colored as if they were part of the object and other pixels being colored as if they were part of the background. This jagged appearance becomes more pronounced when the object is scaled downward as fewer pixels are then used to produce the object which causes greater disjointedness along the edge of the object.

It is desirable to eliminate the aliasing in stop motion video images to enhance the realistic appearance of the image. While anti-aliasing techniques are available in many video applications, the stop motion animator often has to individually change the pixels along the outer contour of the image to ensure that both the aliasing effects are minimized and the background does not appear as a halo around the final beauty shot of the image. Again, this is a very time consuming and expensive process.

A further problem with existing stop motion animation techniques is that it is often difficult and expensive to add such things as shadows corresponding to the object into the stop motion animation sequence. One method of generating shadows corresponding to an animated object is to either draw or digitally create the shadow for each frame of the sequence. As can be appreciated, it is an expensive process to draw or otherwise create a shadow for each of the different frames of the sequence. Further, these shadows are often not very realistic in appearance as they do not exactly correspond to the actual shadow that would be created by the object in a specific pose.

Hence, there is a need in the art for a stop motion animation system that produces stop motion animation sequences of objects to be placed into another background, that does not require an animator to individually touch up each beauty shot of the object. To this end, there is a need for a system which obtains a beauty shot and a matte shot of an object and then automatically combines these two shots to obtain a final beauty shot where all of the background surrounding the object has been removed. A further need is that such a system should also be able to scale the final beauty shot of the object in such a way that anti-aliasing can be automatically performed while minimizing the amount of touch-up processing that needs to be performed by the animator. Finally, there is a need in the art for a system that can automatically generate and store shadows corresponding to each beauty shot so that the shadow of the object can also be shown in the animation sequence.

SUMMARY OF THE INVENTION

The aforementioned needs are satisfied by the stop motion animation system of the present invention which includes a lighting system configured to light an object in a desired pose, so that a camera can take a beauty shot and a matte shot of the object in the desired pose. The lighting system is also arranged so that it can cause the object to produce a shadow that the camera can record. The animation system then captures and stores the beauty shot, shadow shot, and matte shot of the object in memory. The animation system is then used to combine the matte shot with the beauty shot so that a final beauty shot is produced whereby all of the background surrounding the object is removed. The final beauty shot is then stored in memory, from where it can be subsequently scaled and processed to be placed into a separate frame containing a different background as part of an animation sequence.

Hence, the animation system of the present invention can be used to generate an entire animation sequence by simply posing and reposing the object into different configurations and repeating the above-described process for each pose. Advantageously, the combining of the matte shot with the beauty shot results in a final beauty shot whereby all of original background has been removed so that the final beauty shot can be inserted into a different background using known techniques with no halo or discoloration from the original background.

Another aspect of the present invention is that the system can also capture and record a shadow shot corresponding to the beauty shot of the object. By using overhead lights to illuminate the object in its desired pose, a shadow is created underneath the object on a flat surface. The animation system then captures a shadow shot of the object with its projected shadow on the surface. The shadow shot is then processed so that only the shadow remains. This shadow is stored as a final shadow shot. The final shadow shot is scaled, processed, and indexed to the corresponding final beauty shot which permits it to be displayed in the animation sequence with the final beauty shot.

In one preferred embodiment, the animation system is essentially comprised of a video capture system and a graphics processing system. The video capture system receives analog NTSC format signals from a camera. Signals received from the camera, i.e., the beauty shot, matte shot and shadow shot are then digitized by the video capture system and stored in a digital format. Subsequently, the video capture system transfers the beauty, matte and shadow shots to the graphics processing system.

The graphics processing system allows an animator to process the matte frame creating a fixed matte frame which is a high contrast image of the silhouette of the object. The graphics processing system also allows the animator to remove the image of the shadow from the shadow shot and to process the image of the shadow so that the final shadow shot is a high contrast image of the shadow.

The graphics processing system further allows the animator to recall the beauty shot from memory and view it on a video display, then recall the fixed matte shot from memory so that the animator can place the fixed matte shot over the beauty shot. The graphics processing system can then develop a final beauty shot by only storing pixel information about those pixels of the beauty shot that were covered by the fixed matte. In this fashion, a final beauty shot is created where the background surrounding the beauty shot is totally eliminated and further touch up by the animator is not required.

In another aspect of the present invention, the animation system allows for scaling of the final beauty shot. Hence, the animator can reduce or enlarge the size of the final beauty shot from the recorded size of 640 by 480 pixels to a desired size, resolution, and format for its intended use. In one preferred embodiment, the stop motion animation sequences are to be used in video games where the resolution is on the order of 256 by 192 pixels. The present invention also allows the animator to use anti-aliasing techniques to combat the aliasing that results from this reduction in the number of pixels.

Specifically, in one preferred embodiment, the present invention allows the animator to recall the final beauty shot and select a background color for the particular frame. One of a number of well-known anti-aliasing techniques is then used to remove the aliasing effects from the contours of the object in the frame. The anti-aliasing techniques generally fill up certain pixels adjacent the outer contour with background pixels. The animator has preferably selected a color for the background which corresponds with the basic color scheme of the object so that when the anti-aliasing technique fills in the disjointed pixels, it fills them in with a color approximating the color of the object.

Hence, the present system allows the animator to scale the final beauty shot of the object to a desired size and to remove the aliasing effects without having pixels adjacent the outer contours of the object be a color substantially different than the object itself. This minimizes the amount of touch-up the animator has to do in that the animator no longer has to individually select colors for the pixels adjacent the outer contours of the object to minimize the aliasing effects.

These and other objects and features of the present invention will become more fully apparent from the following description and appended claims taken in conjunction with the accompanying drawings.

DESCRIPTION OF THE PREFERRED EMBODIMENTS

Figure 1:
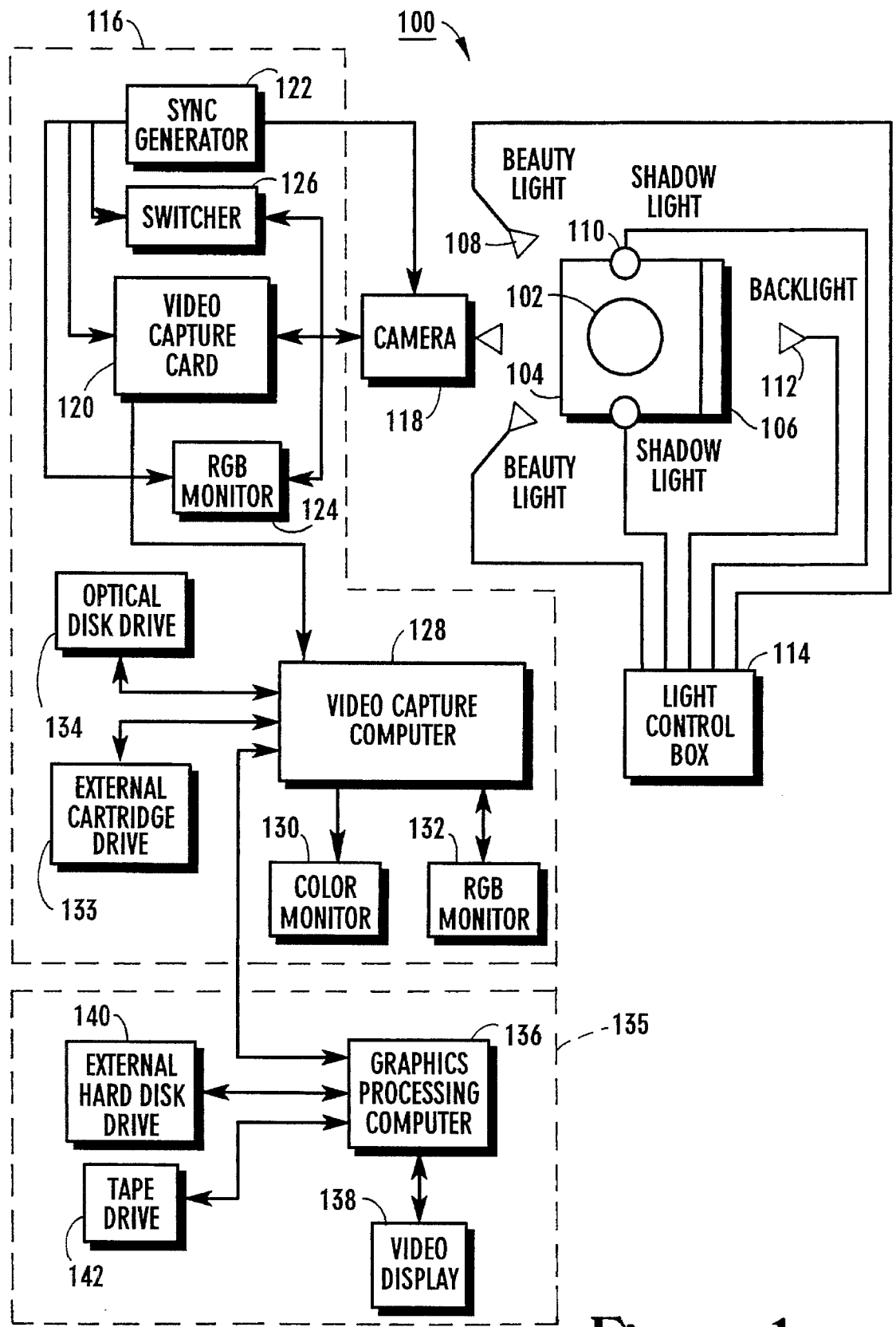
FIG. 1 is a block diagram illustrating the basic configuration of the stop motion animation system of the present invention.

Reference will now be made to the drawings wherein like numerals refer to like parts. FIG. 1 illustrates a basic block diagram of a stop motion animation system 100 of the present invention. This preferred embodiment of the stop motion animation system 100 develops stop motion animation sequences of an object 102, such as a dinosaur (see FIG. 2A). In this preferred embodiment, the object 102 is a puppet having a latex skin covering a fully articulated metal armature. The stop motion animation sequence is made by taking individual pictures of the object 102 in a variety of poses, processing the pictures according to the description that follows below, and then assembling a sequence of the resulting pictures so that, when they are displayed, the object 102 preferably appears to move in a continuous fashion. It should be understood that a stop motion animation sequence is comprised of a series of shots of the object 102. When the sequence is played, each shot is comprised of a series of frames of film or video. The following description describes how individual shots are obtained for the stop motion animation sequence, a sequence can then be developed using well known techniques where each shot is sequentially shown in a sequence of individual identical frames.

In this embodiment, the object 102 is placed on a semi-opaque plexiglass stage 104 in a desired pose. The stage 104 is preferably connected to a semi-opaque plexiglass backdrop 106. At least one beauty light 108 is positioned in front of the stage 104 and the object 102 so that, when the beauty light 108 is lit, it illuminates the object 102 in a similar fashion as theater lights illuminate actors. At least one shadow light 110 is positioned above the object 102 so that the shadow light 110 illuminates the object 102, causing the object 102 to project a shadow on the stage 104 in a manner that will be more fully described hereafter, with reference to FIG. 2B. Finally, a back light 112 is also positioned behind the backdrop 106. Preferably, the backdrop 106 is made of a material so that when the back light 112 is on, the backdrop 106 glows with sufficient brilliance that the object 102 is silhouetted against the backdrop 106.

The lights in this preferred embodiment are controlled via a light control box 114. An animator using the system 100 can selectively turn on some or all of the lights. As will be described in greater detail below, the animator turns on the beauty lights 108 for a beauty shot, the overhead lights 110 for a shadow shot and the back light 112 for a matte shot. As is understood in the art, the arrangement and selection of the lights, stage and backdrop for the stop motion animation system 100 is dependent upon the object used in the stop motion animation sequence and various other artistic considerations. Consequently, the description of the lighting in this application is simply exemplary of one possible lighting scheme, as the exact positioning and types of lights can vary from application to application of the stop motion animation system 100.

A camera 118 is positioned substantially in front of the object 102 and is used to obtain pictures of the object 102 under different lighting conditions. In this preferred embodiment, the camera 118 is a video camera which takes a color video picture of the object 102 under the various lighting conditions. The camera 118 provides video signals to a video capture card 120 which digitizes the video signals. The camera 118 also provides video signals representative of the object 102 to an RGB monitor 124 which allows an animator to preview the video picture that will be taken by the camera 118 and digitized by the video capture card 120.

The camera 118 also provides the video signal to another RGB monitor 132 connected to the video capture computer 128. Both the camera 118 and the video capture card 120 provide a video signal to a switcher 126 which permits the animator to switch the display on the RGB monitor 124 between the current video picture and the last video picture taken of the object 102. This allows the animator to observe the difference in poses of the object 102 to thereby ensure that the motion of the object in the resulting animation sequence will be fluid and continuous. A synch generator 122 provides a synchronizing clock signal to the camera 118, the video capture card 120, the RGB monitor 124, the RGB monitor 132, the switcher 126 and an RGB monitor 132 (described below) to ensure that each of these devices are in simultaneous operation.

The digitized video signals are then supplied from the video capture card 120 to a video capture computer 128 where they are stored in the hard drive of the video capture computer 128. A color monitor 130 and an RGB monitor 132 are connected to the video capture computer 128 which allows the animator to review the stored digitized pictures. The video capture computer 128 is also connected to an optical disk drive 134 and an external cartridge drive 133 which provide additional memory storage to supplement the hard drive storage of the digitized images and also to store previous sequences of digitized images.

Hence, the video capture system 116 receives the video pictures of the object 102 from the camera 118, digitizes these pictures and then stores these pictures in memory. As will be described in greater detail below, in this preferred embodiment, for each pose of the object 102, the animator initially takes a picture of the object 102 with only the beauty lights 108 on, then takes a picture of the object 102 with only the shadow lights 110 on, and finally takes a picture of the object 102 with only the back light 112 on. Thus, for each shot of the desired sequence, the video capture system 116 captures an initial beauty shot of the object 102 in the desired pose, an initial shadow shot of the object 102 in the desired pose and an initial matte shot of the object 102 in the desired pose, digitizes these shots and stores them in memory.

The video capture computer 128 provides files representative of each of the initial beauty, matte, and shadow shots to a graphics processing system 135 where the shots are further processed so that a final matted beauty shot and a final shadow shot are produced. The processing performed by the graphics processing system 135 is described in greater detail below. The graphics processing system 135 includes a graphics processing computer 136 which is networked to the video capture computer 128. The graphics processing computer 136 includes a video display 138 upon which the animator can view each of the beauty, matte and shadow shots of the object 102. The graphics processing system 135 also includes an external hard disk drive 140 and a tape drive unit 142 which provide additional back up memory space for the graphics processing station 135.

Using the graphics processing computer 136, the animator can combine the initial matte shot with the initial beauty shot to obtain a final beauty shot of the object 102 where the background is completely removed from the shot so that only the object 102 in the desired pose remains. Further, the animator can also use the graphics processing computer 136 to obtain a final shadow shot corresponding to the final beauty shot. The animator uses the graphics processing computer 136 to perform these basic operations for each pose of the object 102 in the scenario. The final beauty shots and the final shadow shots of a particular sequence can then be scaled using the graphics processing computer 136 so that the final beauty shots and final shadow shots can be inserted into a new background to form a video stop motion animation sequence.

In this preferred embodiment, the camera 118 is a JVC model KY-27 color camera equipped with a Fujinon CCD16X lens, the video capture card 120 is a NuVista+ Capture+ video capture card, the switcher 126 is a JVC model KM-1200 switcher and the synch generator 122 is a standard 3M synch generator. Both the video capture computer 128 and the graphics processing computer 136 in this preferred embodiment are Apple Macintosh Quadra 800 computers with 24 Megabytes of RAM which work in tandem using Apple's System 7.1 networking application. The video capture computer 128 includes an internal Seagate hard disk drive with 500 Megabyte capacity and the external Ehman Syquest 44 Megabyte removable cartridge drive 133. The optical disk drive 134 in the video capture system 116 is a standard Ricoh/Relax Technology optical disk drive. The graphics processing computer 136 has an internal Quantum disk drive with 230 Megabytes capacity and an internal La Cie/Quantum 1210 hard disk drive with a 1.2 Gigabytes capacity. The external hard disk drive 140 connected to the graphics processing computer 136 is a Mac Warehouse/Maxtor hard disk drive with 1.2 Gigabytes capacity and the tape drive 142 is an Exabyte Model CY-8500 5 mm tape drive. A person skilled in the art can appreciate that the basic hardware of the system 100 can be implemented using any number of different computer configurations and models without departing from the scope of the present invention.

Each stop motion animation sequence produced by the system 100 of the present invention is comprised of multiple frames of the object 102 in a variety of poses. The animator produces each different frame by posing the object 102 in a desired configuration, e.g., moving its arms and legs, and then obtaining an initial beauty, matte and shadow shot using the video capture system 116. The beauty, matte and shadow shots are then further processed using the graphics processing computer 136 to form the final beauty shot and the final shadow shot for the particular frame. The animator repeats this process for each frame whereby the object 102 is preferably reposed in slightly different configurations so that when each of the frames are assembled and displayed, the object 102 appears to move smoothly and continuously.

Figure 2A:
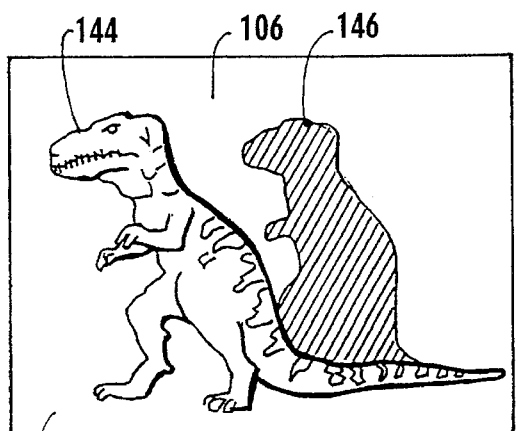
FIG. 2 is a sample initial beauty shot of an object in this case a dinosaur in one possible pose.
FIG. 2B is a sample initial shadow shot of the dinosaur shown FIG. 2A.
FIG. 2C is a sample matte shot corresponding to the dinosaur shown in FIG. 2A.
FIG. 2D is a final shadow shot corresponding to the dinosaur of FIG. 2A.
FIG. 2E is a final beauty shot of the dinosaur shown in FIG. 2A.
FIG. 2F is a sample illustration of the final beauty shot of the dinosaur superimposed against a new background.

FIG. 2A illustrates a representative initial beauty shot of a dinosaur 144 which represents one possible object 102 for which a stop motion animation sequence is developed using the system 100. The initial beauty shot is taken by the video camera 118 in NTSC format (640 by 480 pixels) with the beauty lights 108 lighting the dinosaur 144. The beauty lights 108 generally create shadows 146 on the screen 106 behind the dinosaur 144 which are also recorded by the video capture system 116. It is a desirable feature of the system 100 to produce a final beauty shot of the dinosaur 144 where the shadows 146 and any other extraneous background features are removed, to thereby allow the dinosaur 144 to be placed in a different background such as a jungle scene.

Figure 2B:
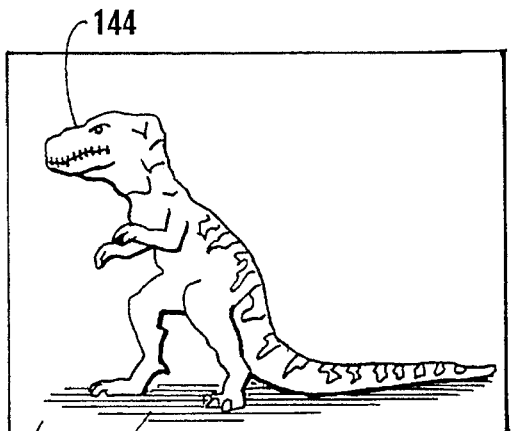

FIG. 2B illustrates a representative initial shadow shot for the dinosaur 144 that is captured by the video capture system 116. The initial shadow shot for the dinosaur 144 is made by taking a video picture of the dinosaur 144 when it is illuminated by the overhead shadow lights 110. This results in a shadow 148 corresponding to the dinosaur 144 being projected onto the surface 104 upon which the dinosaur 144 is standing. The initial shadow frame (FIG. 2B) is refined to produce a final shadow shot using the graphics processing system 135 in the manner described in greater detail below, with reference to FIGS. 3 and 6. A representative final shadow shot is shown in FIG. 2D, which consists of only the shadow 148 of the dinosaur 144 with the dinosaur 144, and all the other shadows in the frame removed. Since this is the actual shadow of the dinosaur 144, the realistic appearance of a stop motion animation sequence which includes the shadow 148 for each pose of the dinosaur 144 is substantially improved.

Figure 2C:
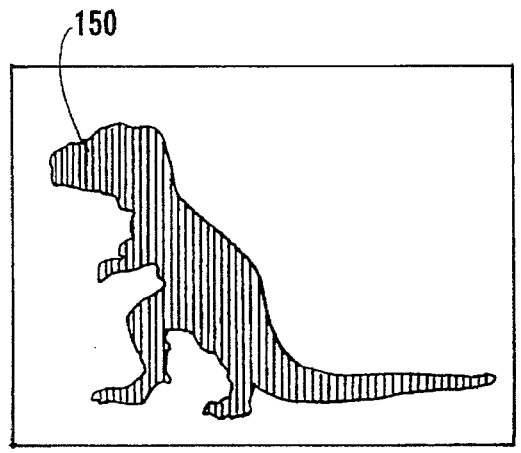
Figure 2D:
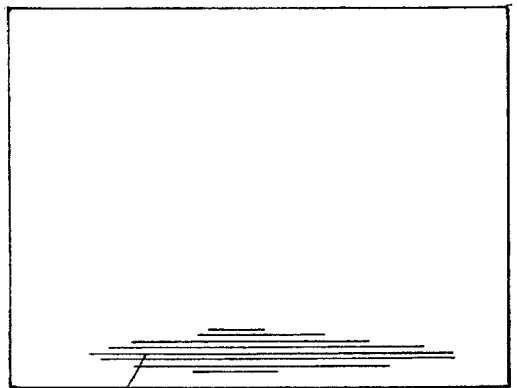

FIG. 2C is a representative matte shot of the dinosaur 144 where the dinosaur 144 is illuminated by only the back light 112 with the beauty lights 108 and the shadow lights 110 turned off. Lighting the dinosaur 144 in this fashion produces a silhouette or matte 150 of the dinosaur. The video capture system 116 then digitally records the matte shot 150. The graphics processing system 135 can then be used to further process and sharpen the matte shot 150. After processing, the matte shot 150 is combined with the initial beauty shot 144 to obtain a final beauty shot.

Figure 2E:
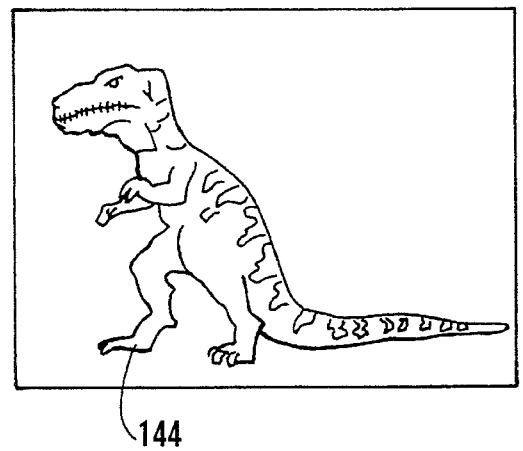

FIG. 2E illustrates a representative final beauty shot 154 of the dinosaur 144. To produce this, the matte shot 150 is combined with the initial beauty shot (FIG. 2A) so that the matte 150 covers the image of the dinosaur 144. To form the final beauty shot, only the portion of the dinosaur 144 which is covered by the matte 150 is reproduced. Hence, extraneous background matter, including the shadow 146 of the dinosaur 144, is removed from the frame and only the final beauty shot of the dinosaur 154 against a solid background remains.

Figure 2F:
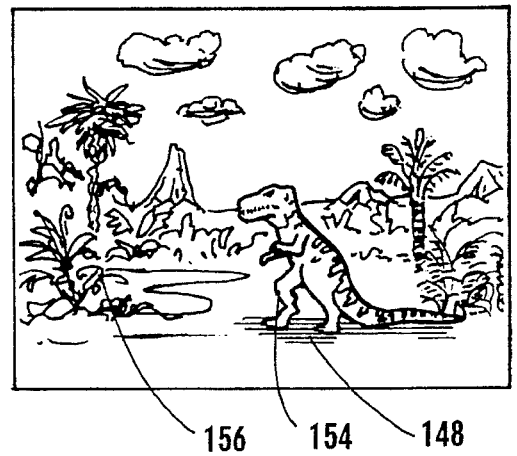

Final shadow and beauty shots are prepared for each of the different frames illustrating poses of the object 102 using the stop motion animation system 100 of the present invention. These final shadow and beauty shots are then scaled and inserted into a new background. FIG. 2F illustrates a representative frame of a stop motion animation sequence where the final beauty shot 154 and the final shadow shot 148 have been scaled and inserted into a background scene 156. In this case, the background scene contains trees, mountains and sky. The entire stop motion animation sequence is comprised of a sequence of final beauty shots and shadow shots of an object similarly positioned against a background scene. Generally, each final beauty shot in a stop play animation sequence is comprised of a plurality of identical frames showing the same pose of the object. The following description describes how a single shot which can be comprised of multiple identical frames is developed. Hence, the process by which the stop motion animation system 100 produces a stop motion animation sequence comprised of the shots shown in FIG. 2F will now be described.

Figure 3:
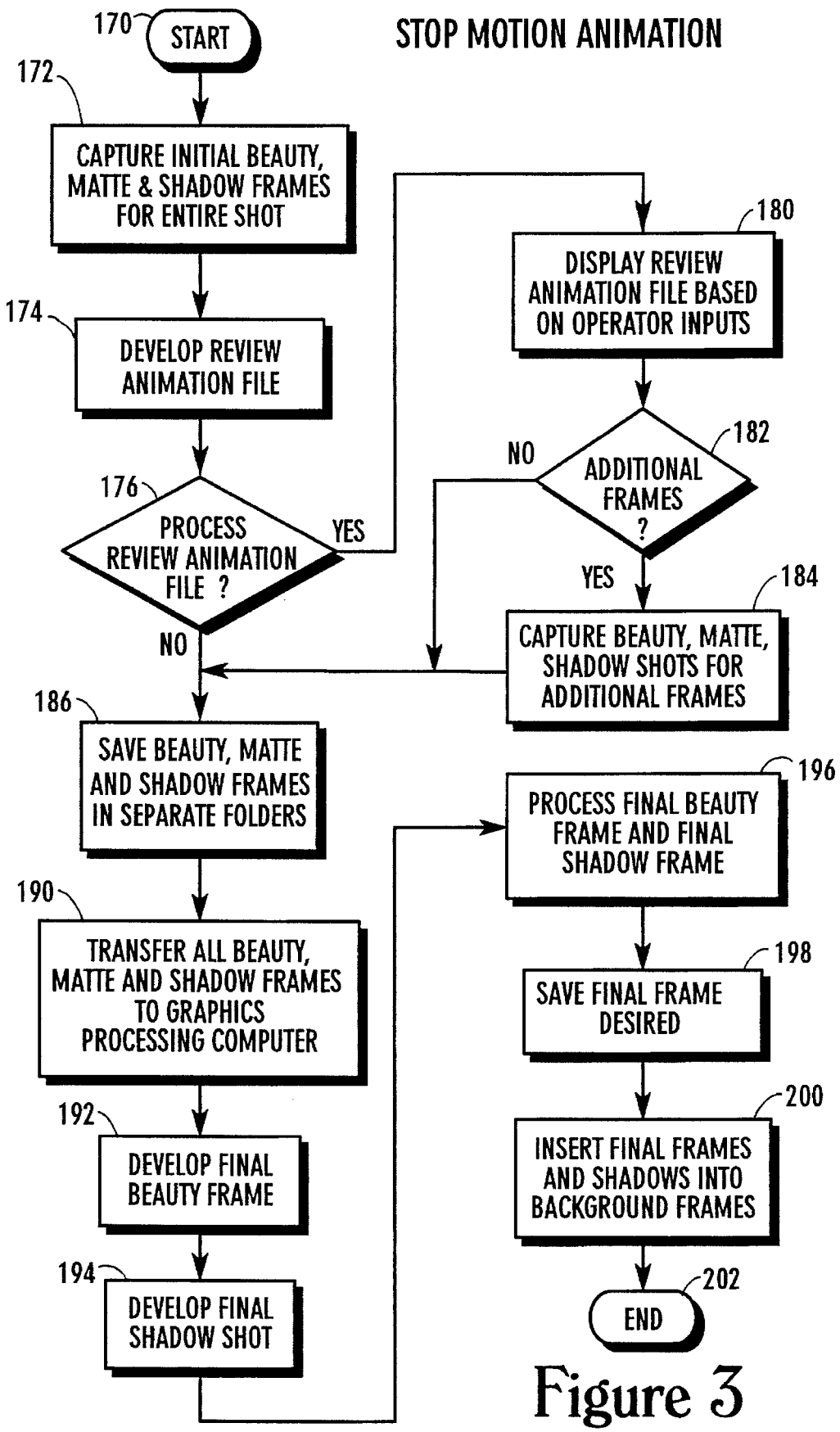
FIG. 3 is a flow chart illustrating the basic operation of the stop motion animation system as it generates a stop motion animation sequence.

FIG. 3 is a flow chart which illustrates the basic operation of the stop motion animation system 100 of the present invention as it develops a stop motion animation sequence. From a start state 170, the animator operating the system 100 proceeds to state 172 where the beauty, matte and shadow shots for each frame of the sequence is captured. The beauty, matte and shadow shots for each frame of the sequence are captured by the animator posing the object 102 in a desired pose. Using the camera 118, the animator takes a video picture of the object 102 as it is illuminated by the beauty lights 108, to capture the initial beauty shot (FIG. 2A) with the video capture system 116. The animator then takes a video picture of the object 102 as it is illuminated by the shadow lights 110 to capture the initial shadow shot (FIG. 2B) with the video capture system 116. The animator then takes a video picture of the object 102 as it is illuminated by the back light 112 to capture the matte shot (FIG. 2C) using the video capture system 116. This process is described in greater detail in reference to FIG. 4 below.

Once the initial beauty, matte and shadow shots for each frame of the sequence is obtained in state 172, a review animation file is generated in state 174 in the memory of the video capture computer 128. The review animation file is simply a compilation of each initial beauty shot for each frame of the animation sequence. Replaying the review animation file via the computer 128 and displaying this file on the color monitor 139 permits the animator to review the resulting movement of the object 102 to ensure that its movement is fluid and continuous and appears to be as realistic as possible. The process by which the computer 128 develops the review animation file is described in greater detail in reference to FIG. 5 below.

Once the review animation file is assembled in state 174, the animator can then decide in decision state 176 whether to review the review animation file. If the animator decides to review the review animation file and appropriately signals the computer 128, the computer 128, in state 180, replays the contents of the review animation file. After reviewing the review animation file, the animator can then decide in decision state 182 whether additional shots of the object 102 are needed to enhance the continuity and fluidity of the object's movement. If additional shots are needed, the animator reposes the object in state 184 and captures additional beauty, matte and shadow shots for the object which the animator can then insert into the desired position in the animation sequence to enhance the movement characteristics of the object 102.

Once the animator is satisfied that a sufficient number of shots of the object 102 have been taken, each shot in the sequence is then stored in state 186 in a file structure which includes three folders, one each for the initial beauty, matte and shadow shots. In state 190 each of the initial beauty, matte and shadow frames are then transferred to the graphics processing computer 136. The graphics processing computer 136 can then be used in state 192 to adjust each of the matte frames and combine them with the corresponding initial beauty frames to produce final beauty frames (FIG. 2E) in the previously described manner. The animator can also use the graphics processing computer 136 in state 194 to produce a final shadow shot (FIG. 2D) for each of the frame of the animation sequence.

Once final beauty frames and final shadow frames are produced for each frame of the animation sequence, the animator can then, in state 196, use the graphics processing computer 136 to process each of the final beauty and final shadow shots so that they are in a format where they can be inserted into a new background. The processed shots are then, in state 198, stored in the memory of the computer 136 from which they can be inserted into background frames in state 200 using well known techniques. The process by which the graphics processing computer 136 produces the final beauty and shadow shots is described in greater detail in reference to FIG. 6 below.

Figure 4:
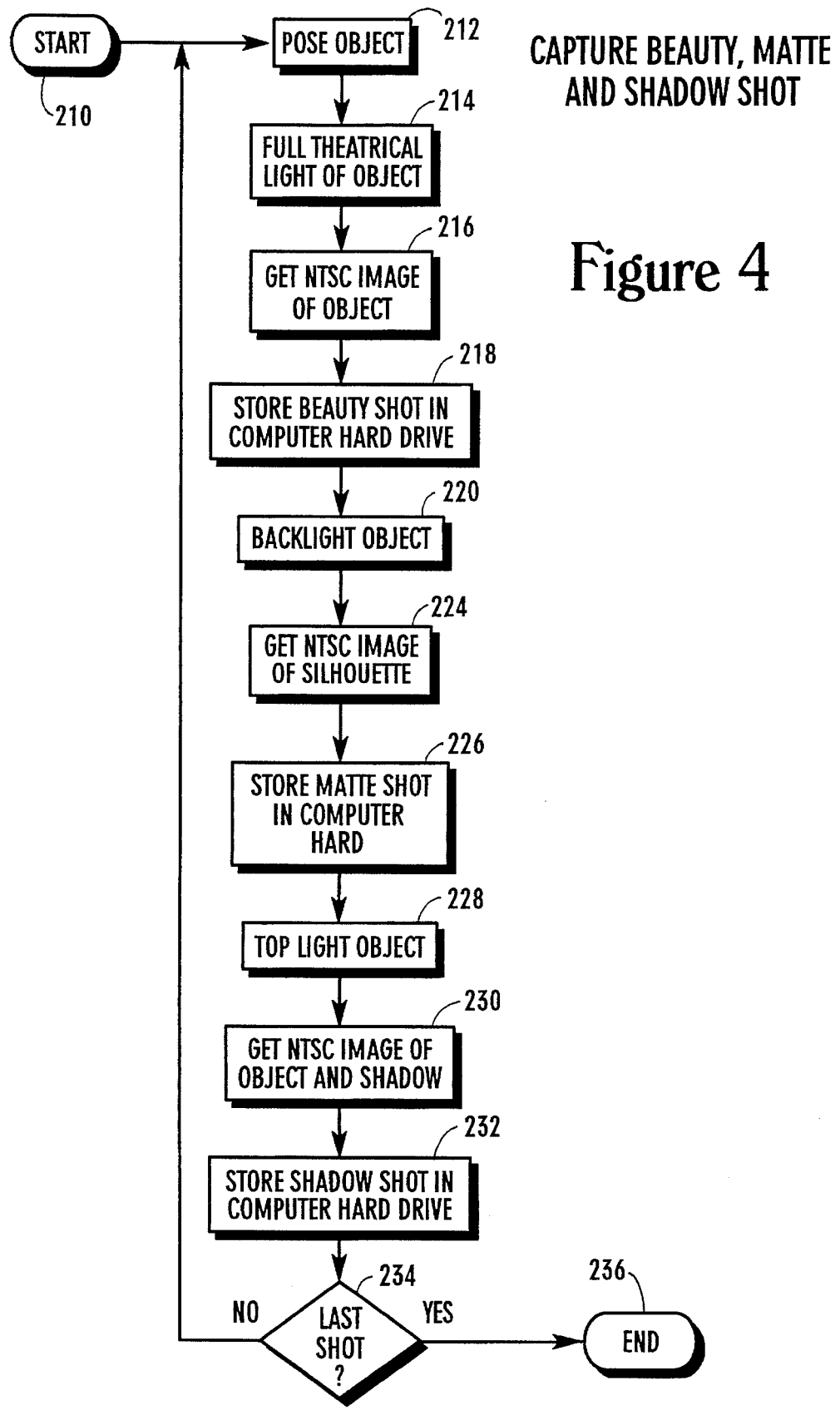
FIG. 4 is a flow chart illustrating the operation of the stop motion animation system as it captures the Beauty, Matte and Shadow shots of an object in a particular pose.

FIG. 4 is a flow chart which illustrates the process by which an animator obtains the initial beauty, matte, and shadow shots for each frame of the stop motion animation sequence. From a start state 210, the animator, in state 212, initially poses the object 102 into a desired pose on the surface 104 (FIG. 1). Subsequently, in state 214 the beauty lights 108 are utilized to fully theatrically light the object 102. In state 216 an NTSC format video image of the illuminated object 102 is then obtained. This NTSC format video image is preferably 640 by 480 pixels, with 72 pixels per inch resolution and 17 million possible colors. In state 218, the image is then provided to the video capture card 120 which digitizes the image and then stores the image on the hard drive of the video capture computer 128.

In state 220 the animator then turns off the beauty lights 108 and turns on the back light 112 so that the object 102 is silhouetted against the back drop screen 106 (FIG. 1). In state 224 the video camera 118 then records an NTSC image of the silhouetted object. In state 226 this NTSC image of the silhouette is then digitized by the video capture card 120 and stored in the hard drive of the video capture computer 128.

In state 228 the animator then turns off the back light 112 and turns on the shadow lights 110 so that the object 102 is illuminated from above. This results in a visible shadow from the object 102 being projected onto the surface 104. In state 230 the video camera 118 is used to obtain a NTSC image of the object 102 and the shadow. In state 232 this NTSC image is then digitized by the video capture card 120 and stored in the hard drive of the video capture computer 128.

After the above-described process has been completed for each shot of the stop motion animation sequence, the animator decides in decision state 234 whether additional shots are needed. If additional shots are needed then the animator reposes the object in state 212. If the animator decides that no additional shots are needed, the process proceeds to an end state 236 and further operation of this process is terminated.

Figure 5:
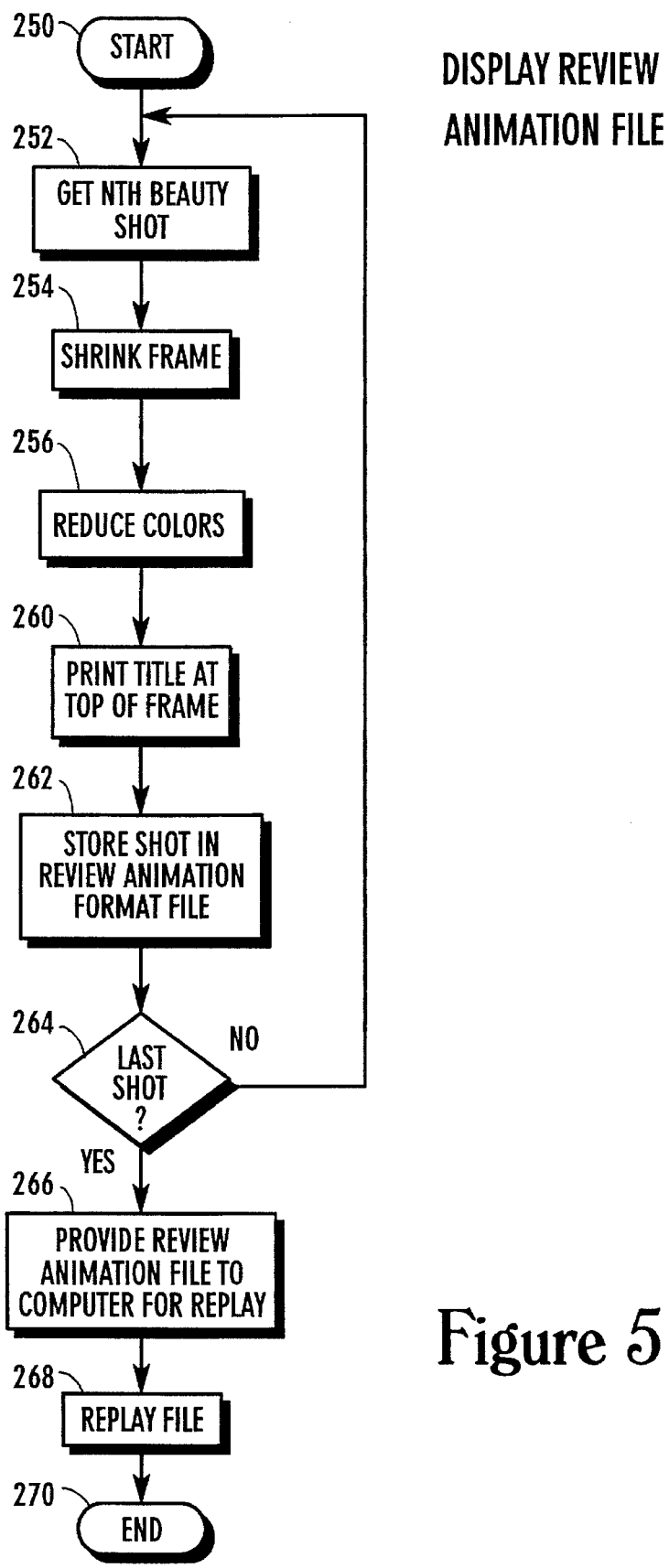
FIG. 5 is a flow chart illustrating the operation of the stop motion animation system as it develops and displays the Review Animation File function shown in FIG. 3.

FIG. 5 is a flow chart which illustrates the process by which a review animation file is developed and played for the animator. As previously discussed, the review animation file feature of the present invention permits the animator to quickly review the initial beauty shots taken of an object 102 to ascertain whether additional shots are needed to ensure that the object 102 appears to have continuous and fluid motion in the stop motion animation sequence. In this preferred embodiment, the review file is developed using the "QuickTime™" file feature of the video capture computer 128. "QuickTime™" is a file feature developed by Apple Computer. It should be appreciated that different programs which perform essentially the same task of quickly assembling a stop motion animation sequence from initial pictures are available and could also be used in the system 100. When the review animation file is selected by the animator using the video capture computer 128, the computer 128 then proceeds from a start state 250 to a state 252 where one of the initial beauty frames is retrieved from the hard drive.

This frame is then reduced in size preferably by 40% in state 254 and the number of colors comprising the object 102 are reduced from the initially available 17 million to 256. The reduction in size and number of available colors is accomplished using well known techniques and, in this preferred embodiment, accomplished using a commercially available graphics processing program called Debabelizer™ developed by Equilibrium Technologies of Sausalito, California which is one of a number of suitable graphics processing programs available on the market.

In state 260, the computer 128 then prints a title at the top of the frame. This is accomplished in this preferred embodiment by the animator, using the video capture computer 128, to assign a title to each stored shot of the object 102. The computer 128, in state 260 then recalls this identification title and prints it at the top of the frame to allow the animator to know which frame is being currently displayed on the monitor 130 when the animation sequence is replayed. In state 262, the adjusted frame with the title is then stored in the memory of the computer 128.

The computer 128 then decides in decision state 264 whether each frame has been processed in the above described fashion. If not all the frames have been similarly processed, the computer 128 returns to state 252 where the next frame is retrieved. Once all of the frames have been processed, the computer 128 moves to state 266 and formats the review file so that it can be displayed. Once the review file has been formatted, the computer 128 in state 268 then replays the file on the color monitor 130. In this preferred embodiment of the present invention the review animation file is replayed using Apple computer's MoviePlayer™ application on the video capture computer 128.

Further, in this preferred embodiment, the animator can control the rate and manner at which the animation is displayed using the input devices attached to the video capture computer 128. For example, the animator can freeze the display of the file, or display the file in slow motion frame by frame. This allows the animator to closely review the developed animation sequence to assess whether additional shots or frames are needed. Once the file has been replayed, the computer 128 proceeds to an end state 270 and terminates operation of this routine.

Figure 6:
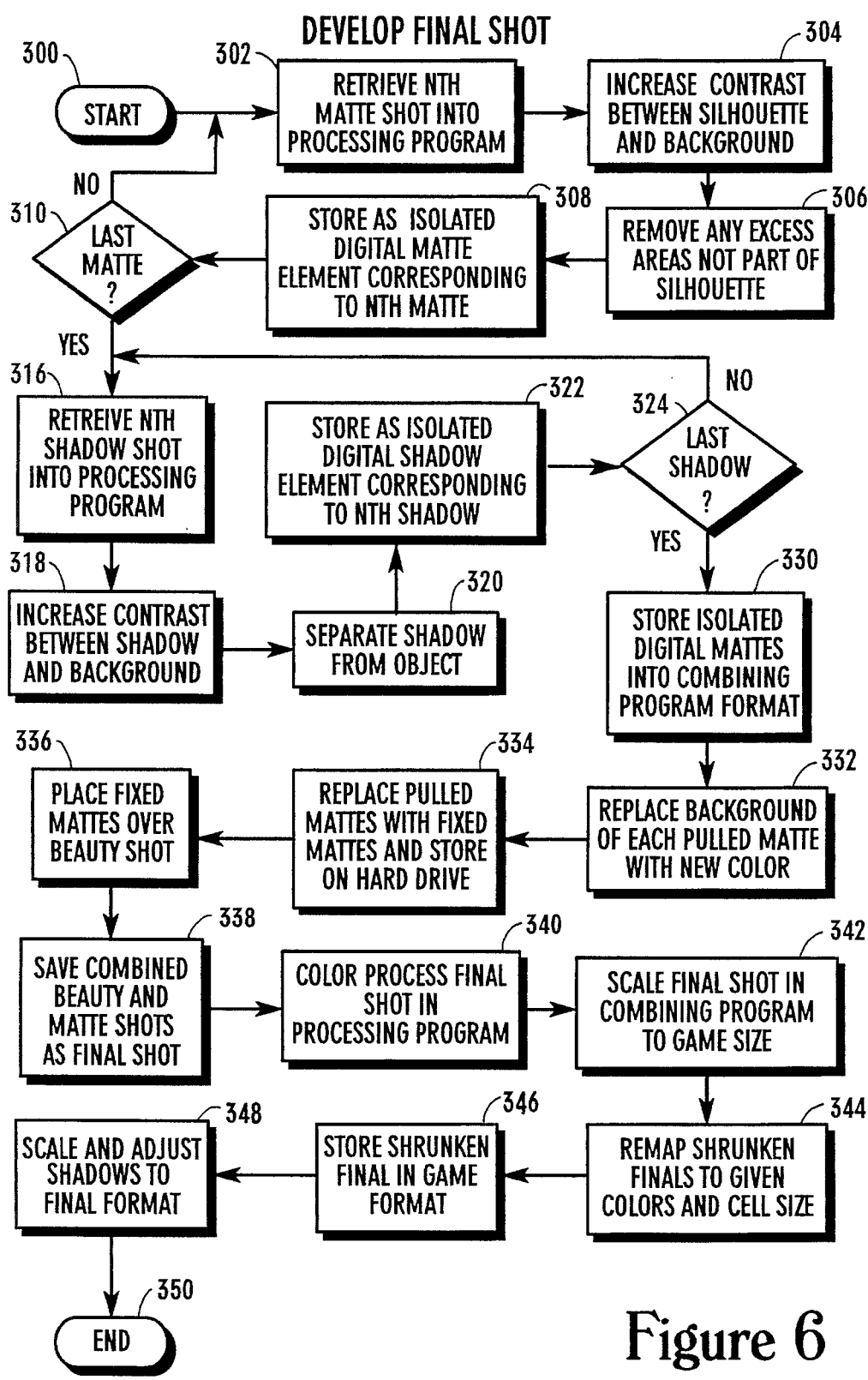
FIG. 6 is a flow chart illustrating the operation of the stop motion animation system as it develops the final beauty and shadow shots for the object and processes these final shots into a desired format.

FIG. 6 is a flow chart which illustrates how the graphics processing computer 136 is used to develop each of the final beauty shot and final shadow shot of the animation sequence. From a start state 300 the graphics processing computer 136 proceeds to state 302 where it retrieves one of the matte frames into a graphics processing program and it is displayed on the color monitor 138. In this preferred embodiment, the matte frame is retrieved initially into a graphics processing program entitled Photoshop™ made by Adobe Systems, Inc., and it is displayed to the animator on the color monitor 138 (FIG. 1). Photoshop™ is a well known commercially available video and graphics processing program that is adaptable to be used on the graphics processing computer 136.

Once the initial matte frame is retrieved into the graphics processing program, the animator then uses, in state 304, the tools available through the program to increase the contrast between the silhouette matte and the background. Specifically, in this preferred embodiment, the Image:Adjust-:Brightness/Contrast menu command is selected in the Photoshop™ program and the contrast dialogue box is preferably increased by the animator to a value of 50.

In state 306, the animator then cleans up the matte of the object 102 by further increasing the contrast between the object 102 and the background and removing any excess portion displayed on the color monitor 138 which does not correspond to the actual image of the object 102. As can be appreciated, when the initial matte shot is obtained, there may still be some residual shadows or objects, other than the silhouette 150 of the object 102, that are captured by the video capture system 116. The animator can observe these features on the video display 138 and remove them using the tools provided by the graphics processing program as implemented on the computer 136. Specifically, in this preferred embodiment, the animator cleans up the image in state 306 by selecting the silhouette using the Magic Wand™ Selection Tool provided by the Photoshop™ program with the tolerance value preferably set to 55 and with no anti-aliasing. The animator then uses the Lasso Tool™ to remove any portions of the image on the color monitor 138 which do not correspond to the object 102.

Once the animator has cleaned up the matte image, the system moves to state 308 and stores the resulting image in the hard drive of the graphics processing computer 136 as an isolated digital matte element, otherwise referred to as a pulled matte, corresponding to this initial matte shot. This results in the computer 136 translating the portion of the initial matte shot selected by the animator in state 306 into a new black and white document where the silhouette is preferably black and the background is preferably white. Processing the initial matte shot into a clean, black and white pulled matte image reduces the amount of memory needed to store the image in the system 100. Specifically, in this preferred embodiment, the selected area comprising the pulled matte is pasted onto a new 640 by 480 72 dpi resolution grayscale document using the Photoshop™ program.

The animator then decides in decision state 310 whether this process has been repeated for each of the initial matte shots provided by the video capture system 116. In state 302, if not all the matte shots have been processed in this fashion, the next matte shot is retrieved into the processing program. Once all of the matte shots have been processed, the animator then proceeds to process the initial shadow shots in a similar fashion.

Specifically, in state 316, one of the initial shadow shots provided to the graphics processing computer 136 in state 190 (FIG. 3) is retrieved into the Photoshop™ graphics processing program. Once the shadow frame is retrieved into the graphics processing program and displayed on the color monitor 138, the animator uses, in state 318, the tools available through the graphics processing program to increase the contrast between the shadow and the background and other objects in the frame. This is accomplished in substantially the same manner as the contrast was increased in state 304 for the initial matte frame.

The animator then selects, in state 320, only the portion of the frame containing the shadow of the object 102 projected onto the surface 104 (FIG. 1). In this preferred embodiment, this portion of the frame is selected using the Magic Wand™ Selection Tool set to a tolerance of 35 and no anti-aliasing. Input devices of the computer 136 such as a mouse are used to outline this portion of the frame on the screen and separate it out from the rest of the frame. Preferably, the animator uses a mouse and the paintbrush tool to draw a line where the object 102 is standing on the screen. In shots where the object 102 is a dinosaur standing on the screen (see FIG. 2B) a horizontal line is drawn just above the shadow, cutting the dinosaur 144 at about the ankles.

Once the shadow portion of the frame has been selected in state 320, the selected portion is saved in state 322 into a 640 by 480, 72 dpi resolution grayscale document in the hard drive of the graphics processing computer 136 as an isolated digital shadow element otherwise referred to as a pulled shadow shot. The animator then determines in decision state 324 whether each of the initial shadow shots have been processed in the above-described fashion. If not all of the shadow shots have been so processed, the next initial shadow frame is retrieved into the graphics processing program in state 316.

Once all the shadow shots have been processed in the above described fashion, the process switches to a different graphics program which allows for combining of images. In this preferred embodiment, the combining program is the previous described Debabelizer™ program. In state 330, each of the pulled matte shots stored in state 308 are batch translated into a file format which can be used by the combining program to place the matte shots over the initial beauty shots. In this preferred embodiment, the stored matte shots are batch saved into a 17 million color PICT where PICT is a widely recognized format used by almost all commercial graphics processing applications.

Once each of the pulled matte shots have been saved into the combining format, the white background of each of the pulled matte shots is changed to a color background in state 332. The color of the new background is preferably a color which is not found in the object 102. Changing the colors of the background of each of the matte elements can be accomplishing using the batch processing tools in the Debabelizer™ program. In state 334, the new mattes, referred to as fixed mattes in this preferred embodiment, are then stored in the hard drive of the graphics processing computer 136 replacing the pulled matte shots.

The fixed mattes are then placed on top of their corresponding beauty frames in state 336. The beauty frames were provided to the graphics processing computer 136 in state 190 (FIG. 3). Preferably, the new file format for the fixed mattes corresponds to the file format for the beauty frames, i.e., in this case both the beauty frames and the matte frames have the same number of possible colors, pixel resolution and bit depth. Further, since the image of the object 102 is preferably centered in the beauty frames and the silhouette is preferably centered in the fixed mattes, the black silhouettes should cover the image of the object 102 in each of the beauty frames. In this preferred embodiment, the fixed mattes can be placed over the beauty frames using the Batch, Place command of the Debabelizer™ function with the Edit, Selection Transparency option set to black.

The computer 136 then saves in state 338 only the portion of the initial beauty shot that was covered by the black silhouette of the fixed matte as the final beauty shot. This portion of the final beauty shot comprises a perfectly matted version of the initial beauty shot in that the shot contains only the image of the object 102 without any of the original background. Further, the background in the final beauty frame at this point is one uniform color. Hence, the present invention permits the animator to generate perfectly matted versions of the original beauty shots that do not contain any of the original background, without requiring individual adjustment of each of the final beauty shots to remove the original background.

The final beauty shots are then color processed using the graphics processing program in state 340. In this preferred embodiment, the final beauty frames are then transferred back to the Photoshop™ program and the animator uses the color processing tools of the Photoshop™ program to adjust the colors contained in the object 102. The adjustments depend upon how the animator wants the object 102 to appear, and upon the various options that are available in the Photoshop™ program, or any of its equivalents.

Once the final beauty shots have been color processed, the animator, in state 342, can then scale the final beauty shot to the desired size. In this preferred embodiment, scaling is performed using the Debabelizer™ program's "Sine-sharp" and "Average to Shrink" scaling options.

When scaling is performed, a proportionate number of pixels are removed from the figure to produce the smaller number. For example, when a 640 by 480 pixel frame is being reduced to 320 by 240 pixels, every other pixel is removed from the frame. As can be appreciated, scaling reduces the clarity of the image in the frame and it also results in greater aliasing effects along the curved contours of the scaled images in the frame. In this preferred embodiment, the animator can scale the images using an anti-aliasing technique or the animator can scale the image where no anti-aliasing is used. The anti-aliasing technique which the animator can use is described in greater detail in reference to FIG. 7 below.

Once each of the final beauty shots have been scaled to the desired size, the final beauty shots are remapped in state 344 to a desired size and color. Generally, the scaling performed in state 342 produces beauty shots that are reduced to the size at which they will appear in the new background. For example, if the stop motion animation sequence is being prepared for a video game, the 640 by 480 pixel frame will be reduced to a size that is dictated by the video game hardware. Similarly, the original 17 million colors of the beauty shot will also be reduced to the fixed number of colors that the color processor in the video game can provide. The final beauty shot of the stop motion animation process may also be adjusted to comply with other parameters of the system that will be displaying the stop motion animation sequence. Once this adjusting is done, the final beauty shots are then stored, in state 346, in the final format for use in the system displaying the stop motion animation sequence.

Similarly, in state 348 each of the pulled shadow shots stored in state 322 are scaled the same amount as the corresponding beauty elements in state 342 and are also placed in the final format. The scaling and adjusting of the shadows can be accomplished using the Debabelizer™ program in the previously described manner. Once each final beauty shot and final shadow shot have been scaled and adjusted to be in the final format, the process proceeds to an end state 350 where its operation is terminated.

Figure 7:
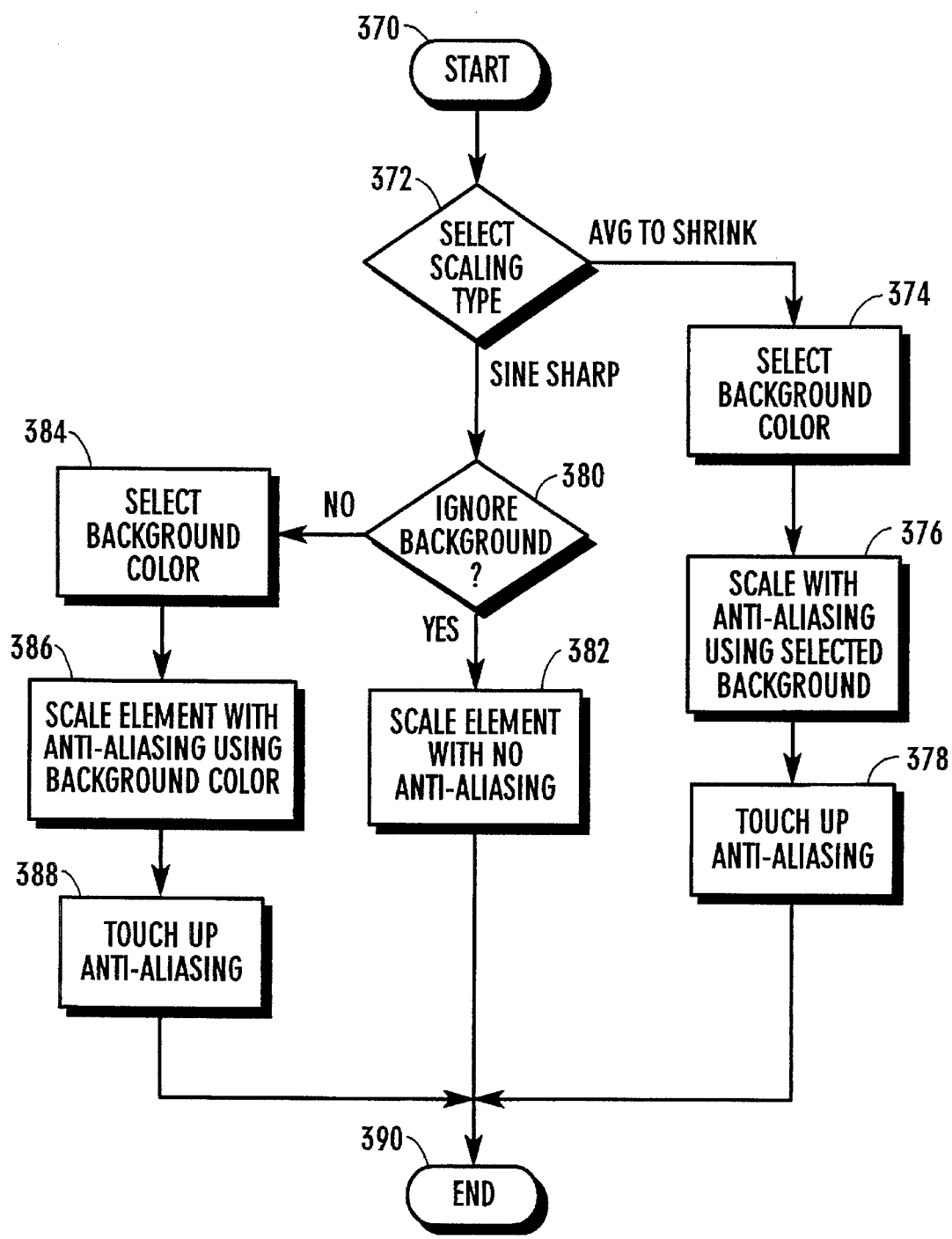
FIG. 7 is a flow chart illustrating the operation of the stop motion animation system as it scales and anti-aliases the final beauty shots for the object.

FIG. 7 is a flow chart which further illustrates the anti-aliasing and scaling operations performed by the graphics processing computer 136 in state 342 (FIG. 6). From a start state 370, the animator initially determines in decision state 372 which of the two available scaling options, "Average to Shrink" or "Sine-sharp" are to be used for this particular animation sequence.

If the animator selects the "Average to Shrink" option, the computer 136 scales each of the final beauty shots using an anti-aliasing technique which takes into account the background selected by the animator. Hence, the animator must select a background color in state 374. Preferably, the animator selects a background color which is substantially the same as the color of the object 102 at its outer contours where the object 102 is adjacent the background.

Once the animator has selected the appropriate background using the Debabelizer™ program implemented on the video graphics computer 136, the computer 136 then scales in state 376 the beauty elements to the desired size using the "Average to Shrink" scaling function implemented on the Debabelizer™ program. The Debabelizer™ program used in this preferred embodiment is modified so that the "Ignore Background" option is disabled so that when the final beauty shot is scaled, anti-aliasing is always performed taking into account the background color.

As is understood in the art, anti-aliasing techniques simply try to select the color of the pixels adjacent the outer contour of the object so that the aliasing, or stair-stepped, appearance of the object is minimized. In this embodiment, the anti-aliasing techniques fill in these pixels with colors which the animator can select in state 374 to be similar to the color of the object 102 at its outer contours. Hence, the scaling and anti-aliasing techniques preferably result in a scaled picture of the object 102 where the stepped appearance is minimized. In state 378, once the beauty element has been scaled, the animator can then use the computer 136 to touch up the anti-aliasing. Specifically, the animator can selectively change the color of particular pixels as the scaled beauty frame is shown on the color monitor 138 to further minimize the aliasing effect.

If, in decision state 372 the animator selects the "Sinesharp" scaling option, the animator then has the choice in decision state 380 as to whether the anti-aliasing techniques will be used when the beauty frame of the object 102 is scaled. As can be appreciated, when the outer contour of the object 102 is a variety of colors, using a single background color for anti-aliasing purposes in the manner described in reference to states 376 and 378 could result in an undesirable appearance for the object 102. In that case, the animator can select the "Ignore Background" option in the Debabelizer™ scaling function. The computer 136 will then scale the beauty frame with no anti-aliasing techniques in state 382 which results in a scaled beauty frame where the contour of the object 102 is not anti-aliased.

However, if the animator wishes to use the "Sine-sharp" scaling option and also to have anti-aliasing, the animator can not choose the "Ignore Background" option in decision state 380. In this case the animator selects an appropriate background color in state 384 and the computer then scales the beauty frame in state 386 while using substantially the same anti-aliasing technique previously described. Subsequently, in state 388, the animator continues to change various pixels in the same fashion as described above in reference to state 378 to further enhance the anti-aliasing techniques.

Once the beauty frame has been scaled, the process proceeds to an end state 390 and terminates operation. Hence, the scaling options available for the beauty frames in the present invention allow the animator to scale the beauty frame to the desired size and use an anti-aliasing tool whereby the outer contour of the image of the object 102 appears smoother due to color changes of selected adjacent pixels.

The foregoing disclosure has described a preferred embodiment of a system for developing stop motion animation sequences. This system permits the animator to develop beauty frames of the object which are perfectly matted so that no background colors remain in the beauty frame. This system also permits the animator to use an anti-aliasing technique which results in smoother contours for the images of the object when the stop motion animation sequence is replayed.

Further, this system permits an animator to obtain an actual shadow for each frame of the animation sequence so that the shadow can be displayed along with the actual object. This enhances the realistic appearance of the displayed stop motion animation sequence as the shadow will change shape and form in conjunction with change in the positioning and movement of the object.

Finally, the present invention allows for stop motion animation sequences of objects to be developed in an efficient and flexible fashion as the picture frames of the objects are digitally recorded. This allows the picture frames to be processed using well known graphics processing techniques in such a way that the amount of time the animator has to spend touching up each individual frame to remove background material and the like is minimized.

Although the foregoing description of the preferred embodiment of the present invention has shown, described and pointed out the fundamental novel features of the invention, it will be understood that various omissions, substitutions, and changes in the form of the detail of the system as illustrated, as well as the uses and methods of uses thereof, may be made by those skilled in the art without departing from the spirit of the present invention. Consequently, the scope of the invention should not be limited to the foregoing discussion but should be defined by the appended claims.

What is claimed is:

1. A system for developing stop motion animation sequences for an object positioned on a surface comprising:

a lighting system including at least one beauty light and at least one back light, wherein said beauty light illuminates said object to produce a beauty image of said object and wherein said back light illuminates said object to produce a silhouette image of said object;

an image capture system which receives said beauty and said silhouette images and electronically captures said beauty and silhouette images respectively as a beauty shot and a matte shot, said beauty shot comprising an image of said object against a first background wherein said image occupies a first position in said beauty shot, and said matte shot comprising an image of said silhouette of said object against a second background wherein said silhouette occupies a first position in said matte shot an defines a first region of said matte shot; and a graphics processing system which receives said beauty shot and said matte shot from said image capture system, and combines at least a portion of said matte shot with at least a portion of said beauty shot in a predetermined relationship, so as to produce a final beauty shot comprising a uniform background and a portion of said beauty shot wherein said final beauty shot is configured to be one of a plurality of final beauty shots that comprise a stop motion animation sequence.

2. The system of claim 1, wherein said beauty shot and said matte shot have a predetermined format where said first position in said beauty shot corresponds to said first position in said matte shot and said graphics processing system combines said beauty shot and said matte shot, so as to produce said final beauty shot which is comprised of a uniform background and a portion of said image of said object in said beauty shot that lies within said first region of said matte shot.

3. The system of claim 1, wherein said image capture system comprises:

a camera which obtains said beauty and said silhouette images of said object;

an image capture card which, responsive to signals from said camera, electronically records a signal corresponding to said beauty and said silhouette images of said object as said beauty and said matte shots in a storage device; and a computer having access to said storage device and having an associated display device which displays said beauty and said matte shots.

4. The system of claim 3, wherein said camera obtains analog signals representative of both said beauty image and said silhouette image and said image capture system translates said analog signals into digital signals and stores said digital signals in said storage device as said beauty and said matte shots.

5. The system of claim 1, wherein said graphics processing system comprises a computer with user operable inputs and an associated display device, such that a user can use said computer to view said beauty shot and said matte shot and position said matte shot over said beauty shot to produce said final beauty shot.

6. The system of claim 5, wherein said graphics processing system includes at least one input device which allows a user to selectively alter said beauty shot, said matte shot and said final beauty shot while said beauty shot, said matte shot or said final beauty shot is displayed on said display device.

7. The system of claim 6, wherein said final beauty shot is at least one of a plurality of colors and said user can use said at least one input device to change said at least one of a plurality of colors of said final beauty shot to a desired color.

8. The system of claim 1, wherein said lighting system further includes at least one shadow light which illuminates said object to thereby produce a shadow of said object on said surface.

9. The system of claim 8, wherein said image capture system receives an image of said shadow and captures said image of said shadow as a shadow shot, wherein said shadow occupies a first position in said shadow shot and wherein said graphics processing system receives said shadow shot and processes said shadow shot to produce a final shadow shot corresponding to said final beauty shot.

10. The system of claim 9, wherein said shadow shot is comprised of an image of said shadow and an image of said object, and wherein said graphics processing system removes said image of said object to obtain said final shadow shot.

11. The system of claim 9, wherein said graphics processing system removes all portions of said image of said object in said shadow shot which are not immediately adjacent to said image of said shadow to thereby produce said final shadow shot.

12. The system of claim 1, wherein said graphics processing system processes said matte shot so that said matte shot is comprised of an image of said silhouette in a first uniform color, with an outline substantially corresponding to the outline of said object, positioned against a background of a second uniform color.

13. The system of claim 12, wherein said graphics processing system includes a storage device, and wherein said matte shot and said beauty shot are stored in said storage device in a first format which allows said beauty shot and said matte shot to be combined to form said final beauty shot.

14. The system of claim 1, wherein said final beauty shot is an image comprised of a plurality of colored pixels, and wherein said graphics processing system scales said final beauty shot to a desired resolution.

15. The system of claim 14, wherein said graphics processing system scales said final beauty shot to a desired resolution using an anti-aliasing technique which minimizes any aliasing effects on said image of said object in said final beauty shot.

16. The system of claim 15, wherein said anti-aliasing technique comprises selectively changing at least some of the pixels adjacent the outer contour of said image of said object in said final beauty shot to a selected color, where said selected color is selected to correspond to said color of said object at said outer contours so that said aliasing effect is minimized.

17. The system of claim 1, wherein said final beauty shot can be placed in a stop motion animation sequence where said background of said beauty shot is replaced with a different background.

18. The system of claim 1, wherein said image capture system captures a plurality of beauty shots and a plurality of matte shots and said graphics processing system uses said plurality of beauty shots and said plurality of matte shots to produce a stop play animation sequence comprised of a plurality of final beauty shots.

19. The system of claim 18, wherein said image capture system includes a display device and said image capture system is used to produce a review animation file comprised of a plurality of said beauty shots which is then be displayed on said display device.

20. A system for developing a stop motion animation sequence for an object positioned on a surface comprising:

a lighting system including at least one beauty light which illuminates said object to produce a beauty image of said object and at least one shadow light positioned to illuminate said object to thereby produce a shadow of said object on said surface;

an image capture system which receives said beauty image and said shadow of said object and electronically captures said beauty image as a beauty shot, comprising an image of said object against a first background wherein said image occupies a first position in said beauty shot, and wherein said image capture system captures said shadow as a shadow shot comprising an image of said shadow against a second background wherein said shadow occupies a first position in said shadow shot; and a graphics processing system which receives said beauty shot and said shadow shot, and wherein said graphics processing system processes said beauty shot to produce a final beauty shot comprised of an image of said object against a uniform background, wherein said final beauty shot is configured to be one of a plurality of final beauty shots comprising said stop motion animation sequence, and wherein said graphics processing system further processes said shadow shot to produce a corresponding final shadow shot which is comprised of an image of said shadow against a uniform background wherein said final shadow shot is configured to be selectively combined with said final beauty shot so as to comprise said stop motion animation sequence.

21. The system of claim 20, wherein said lighting system further includes at least one back light which illuminates said object to produce a silhouette image of said object, and wherein said image capture system captures said silhouette image of said object as a matte shot comprising an image of said silhouette of said object against a third background wherein said silhouette occupies a first position in said matte shot and defines a fist region of said matte shot.

22. The system of claim 21, wherein said graphics processing system further receives said matte shot, wherein said beauty shot and said matte shot have a predetermined format such that said first position in said beauty shot corresponds to said first position in said matte shot, and wherein said graphics processing system combines said matte shot and said beauty shot to produce said final beauty shot which is comprised of a uniform background and an image of the portion of said image in said beauty shot that lies within said first region of said matte shot.

23. The system of claim 22 wherein said image capture system captures a plurality of beauty shots and a plurality of matte shots and wherein said graphics processing system uses said plurality of beauty shots and said plurality of matte shots to produce a stop play animation sequence comprised of a plurality of final beauty shots.

24. The system of claim 23, wherein said image capture system captures a plurality of shadow shots and wherein said graphics processing system further processes said plurality of shadow shots to obtain a plurality of final shadow shots.

25. The system of claim 24, wherein said plurality of final beauty shots and said plurality of final shadow shots are placed into a new background so that said stop play animation sequence is comprised of a plurality of shots having said images of said object from said plurality of final beauty shots and said images of said shadow from said plurality of final shadow shots against said new background.

26. The system of claim 25, wherein said object is a dinosaur puppet with a fully articulated metal armature that can be posed into a variety of different positions and said new background resembles a jungle scene.

27. The system of claim 20, wherein said image capture system comprises:
   a camera which obtains said beauty and said silhouette images of said object;
   an image capture card which, responsive to signals from said camera, electronically records signals corresponding to said beauty and said silhouette images of said object as said beauty and said matte shots in a storage device; and
   a computer having access to said storage device and having an associated display device which displays said beauty and said matte shots.

28. The system of claim 27, wherein said camera obtains analog signals representative of both said beauty image and said silhouette image and said image capture system translates said analog signals into digital signals and stores said digital signals in said storage device as said beauty and said matte shots.

29. The system of claim 28, wherein said graphics processing system comprises a computer with user operable inputs and an associated display device, such that a user can use said computer to view said beauty shot and said matte shot and position said matte shot over said beauty shot to produce said final beauty shot.

30. A system for developing stop motion animation sequences for an object positioned on a surface comprising:
   a lighting system including at least one beauty light which illuminates said object to produce a beauty image of said object, at least one back light which illuminates said object to produce a silhouette image of said object and at least one shadow light which illuminates said object to produce a shadow of said object on said surface;
   a video capture system including a camera, which obtains analog signals representative of said beauty image, said silhouette image and said shadow of said object, and an image capture card which translates said analog signals into digital signals and stores said digital signals in a storage device as a beauty shot, a matte shot and a shadow shot, wherein said beauty shot is comprised of said beauty image against a background such that said image occupies a first position in said beauty shot, wherein said matte shot is comprised of said silhouette image against a background such that said silhouette occupies a first position in said matte shot, and wherein the shadow shot is comprised of said image of said shadow against a background such that said image of said shadow occupies a first position in said shadow shot and defines a first region of said matte shot; and
   a video processing system which has access to said storage device and receives said beauty shot, matte shot and shadow shot from said storage device, wherein said beauty shot and matte shot are in a predetermined format where said first position of said beauty shot corresponds to said first position of said matte shot and wherein said graphics processing system combines said matte shot with said beauty shot and thereby produces a final beauty shot comprised of a uniform background and an image of a portion of said image in said beauty shot lies within said first region of said matte shot, and wherein said video processing system further processes said shadow shot to obtain a final shadow shot comprised of said image of said shadow against a uniform background and wherein said final beauty shot and said final shadow shot are respectively configured to be one of a plurality of final beauty shots and final shadow shot comprise a stop motion animation sequence.

31. The system of claim 30, wherein said graphics processing system includes at least one input device which allows a user to selectively alter said beauty shot, said matte shot and said final beauty shot while said beauty shot, said matte shot or said final beauty shot is displayed on said display device.

32. The system of claim 30, wherein said graphics processing system processes said matte shot so that said matte shot is comprised of an image of said silhouette in a first uniform color positioned against a background of a second uniform color.

33. The system of claim 30, wherein said final beauty shot is an image comprised of a plurality of colored pixels and said graphics processing system scales said final beauty shot to a desired resolution.

34. The system of claim 30, wherein said graphics processing system scales said final beauty shot to a desired resolution using an anti-aliasing technique which minimizes any aliasing effects on said image of said object in said final beauty shot.

35. The system of claim 34, wherein said anti-aliasing technique comprises selectively changing at least some of the pixels adjacent the outer contour of said image of said object in said final beauty shot to a selected color, wherein said selected color is selected to correspond to said color of said object at said outer contours so that said aliasing effect is minimized.

36. The system of claim 30, wherein said plurality of final beauty shots and said plurality of final shadow shots are placed into a new background so that a stop play animation sequence is comprised of a plurality of shots presenting said images of said object from said plurality of final beauty shots and said images of said shadow from said plurality of final shadow shots against said new background.

37. The system of claim 36, wherein said object is a dinosaur puppet with a fully articulated metal armature that can be posed into a variety of different positions and said new background resembles a jungle scene.

38. A method of producing a stop motion animation sequence comprising the steps of:
   positioning an object on a surface in a desired pose;
   illuminating said object with a light to obtain a beauty image of said object;
   electronically capturing a beauty shot of said object comprised of said beauty image against a background, wherein said beauty image occupies a first position in said beauty shot;
   illuminating said object with a light so that a shadow of said object is produced on said surface;

electronically capturing a shadow shot of said object, said shadow shot comprised of said shadow against a background, wherein said shadow occupies a first position in said shadow shot;

processing said beauty shot of said object to obtain a final beauty shot, wherein said final beauty shot comprises an image of said object against a uniform background; and processing said shadow shot of said object to obtain a final shadow shot, wherein said final shadow shot corresponds to said final beauty shot and is comprised of an image of said shadow against a uniform background.

39. The method of claim 38, further comprising the steps of:

illuminating said object with a light so that a silhouette of said object is produced;

electronically capturing a matte shot of said object, wherein said matte shot is comprised of said silhouette against a background, and wherein said silhouette occupies a first position in said matte shot that defines a first region of said matte shot; and combining at least a portion of said matte shot with at least a portion of said beauty shot to produce said final beauty shot which is comprised of a uniform background and an image of a portion of said image in said beauty shot that lies within said first region of said matte shot when said beauty shot and said matte shot were combined.

40. The method of claim 38 wherein the steps of electronically capturing said beauty shot and said shadow shot comprises:

obtaining analog signals using a camera, said signals being representative of said beauty image and said silhouette image; and translating said analog signals into digital signals; and storing said digital signals as said beauty shot and said matte shot.

41. The method of claim 38, further comprising the steps of:

obtaining a plurality of final beauty shots and final shadow shots according to the steps of claim 38;

storing said plurality of final beauty shots and final shadow shots in a storage device;

scaling said plurality of final beauty shots and final shadow shots to a desired size; and replacing said uniform background in said final beauty shots and said final shadow shots with a new background.

42. A method of producing a stop motion animation sequence comprising the steps of:

positioning an object on a surface in a desired pose;

illuminating said object with a light to obtain a beauty image of said object;

electronically capturing a beauty shot of said object comprised of said beauty image against a background, wherein said beauty image of said object occupies a first position in said beauty shot;

illuminating said object with a light to obtain a silhouette of said object;

electronically capturing a matte shot of said object comprised of said image of said silhouette against a background, wherein said silhouette occupies a first position in said matte shot and defines a first region of said matte shot;

combining at least a portion of said beauty shot with at least a portion of said matte shot in a predetermined relationship; and combining said beauty shot and said matte shot in a predetermined relationship to thereby produce said final beauty shot, wherein said final beauty shot is comprised of a portion of said image in said beauty shot, that lies in said first region of said matte shot when said beauty shot and said matte shot are combined.

43. The method claim 42, wherein the steps of electronically capturing said beauty shot and said matte shot comprises:

obtaining analog signals using a camera representative of said beauty image and said silhouette image; and translating said analog signals representative of said beauty image and said silhouette image into digital signals; and storing said digital signals as said beauty shot and said matte shot.

44. The method of claim 42, further comprising the steps of:

obtaining a plurality of final beauty shots and final shadow shots according to the steps of claim 42;

storing said plurality of final beauty shots in a storage device;

scaling said plurality of final beauty shots and final shadow shots to a desired size; and replacing said uniform background in said final beauty shots and said final shadow shots with a new background.

45. The method of claim 42, wherein said step of combining said beauty shot and said matte shot comprises the steps of:

displaying said beauty shot on a video display;

displaying said matte shot on said video display; and positioning said matte shot so that said matte shot overlaps said beauty shot, such that said silhouette in said matte shot is in substantially the same position on said video display as said beauty image in said beauty shot.

\* \* \* \* \*

UNITED STATES PATENT AND TRADEMARK OFFICE
CERTIFICATE OF CORRECTION

PATENT NO. : 5,519,826
DATED : May 21, 1996
INVENTOR(S) : Harper et al.

It is certified that error appears in the above-indentified patent and that said Letters Patent is hereby corrected as shown below:

Column 16, line 31, change "an defines" to --and defines--.

Column 18, line 54, change "a fist region" to --a first region--.

Signed and Sealed this

Eighteenth Day of February, 1997

Attest:

BRUCE LEHMAN

*Attesting Officer*  *Commissioner of Patents and Trademarks*